Oct. 30, 1962  F. D. REILAND  3,061,663
UNDER-FLOOR DUCT SYSTEM FOR ELECTRICAL WIRING
Filed March 30, 1959  7 Sheets-Sheet 5
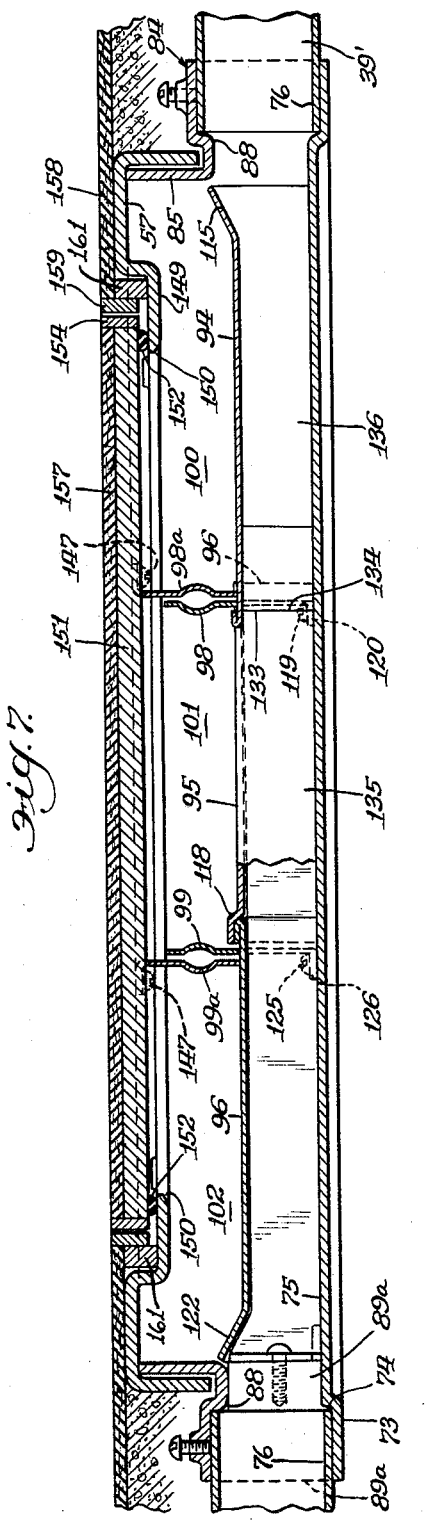
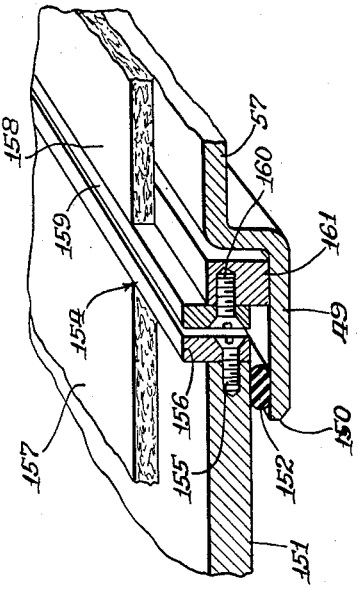
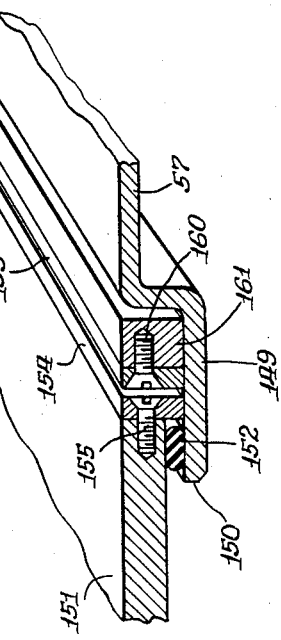
INVENTOR.
Frank D. Reiland
By Harvey M. Gillespie
Atty.

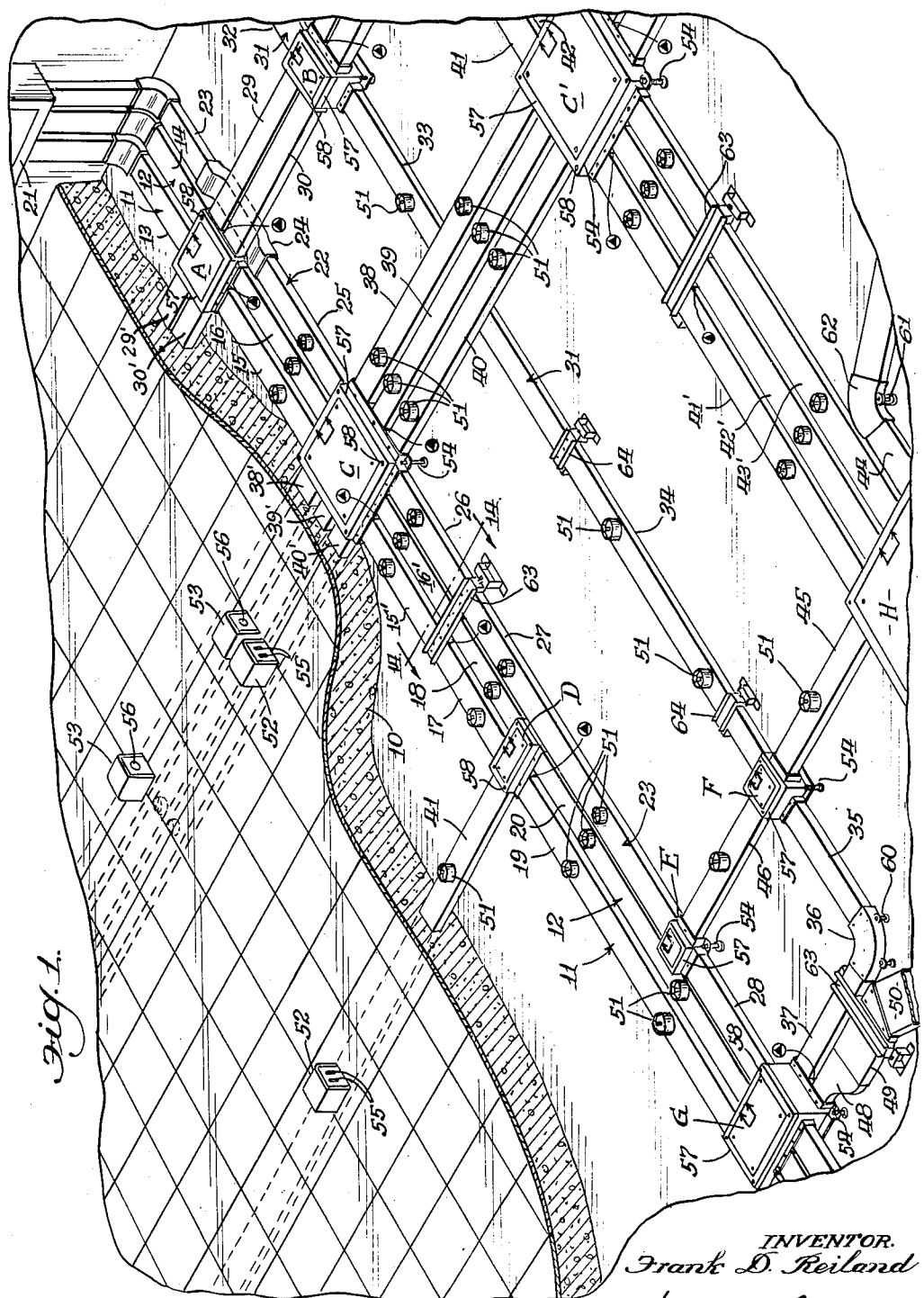

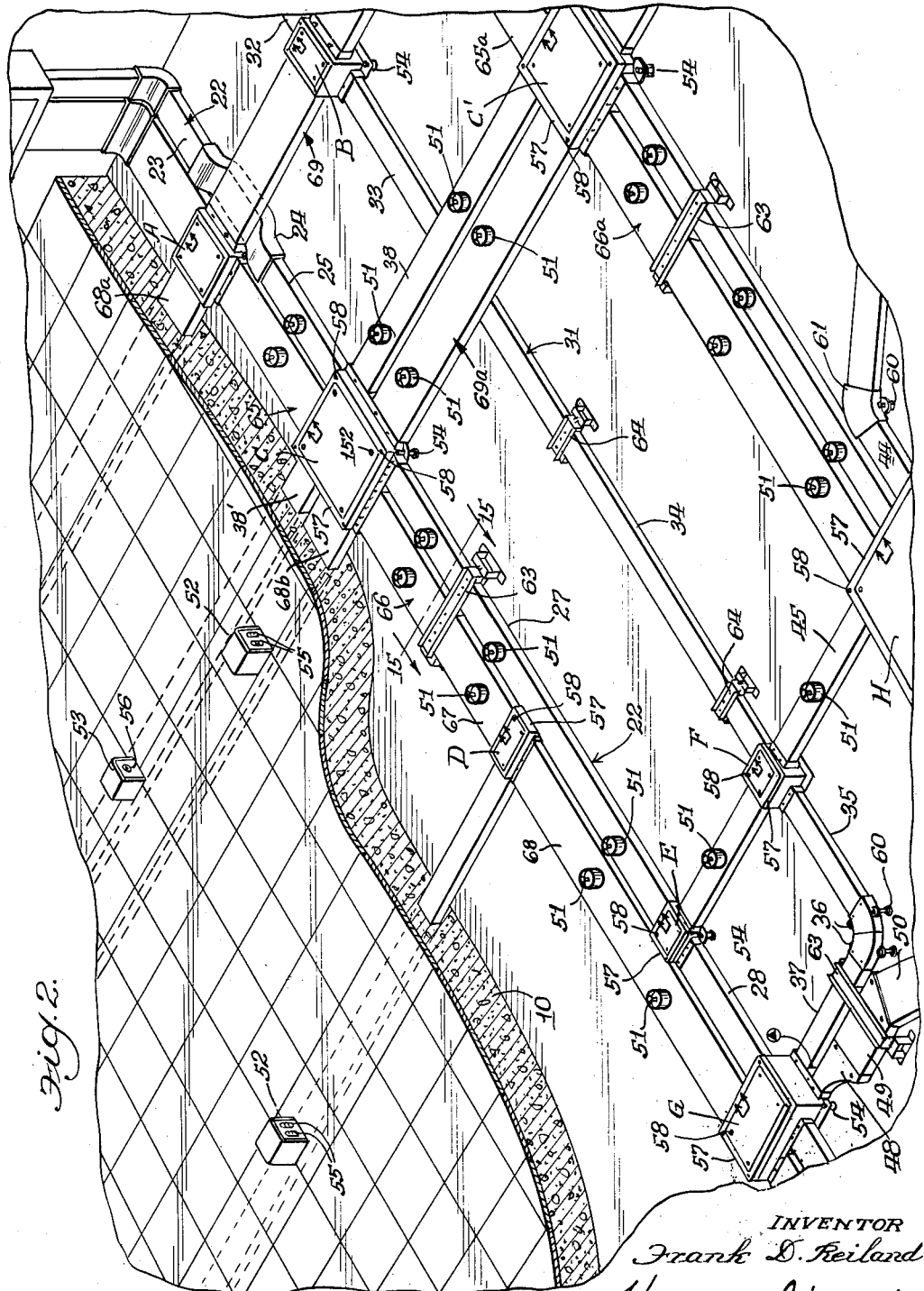

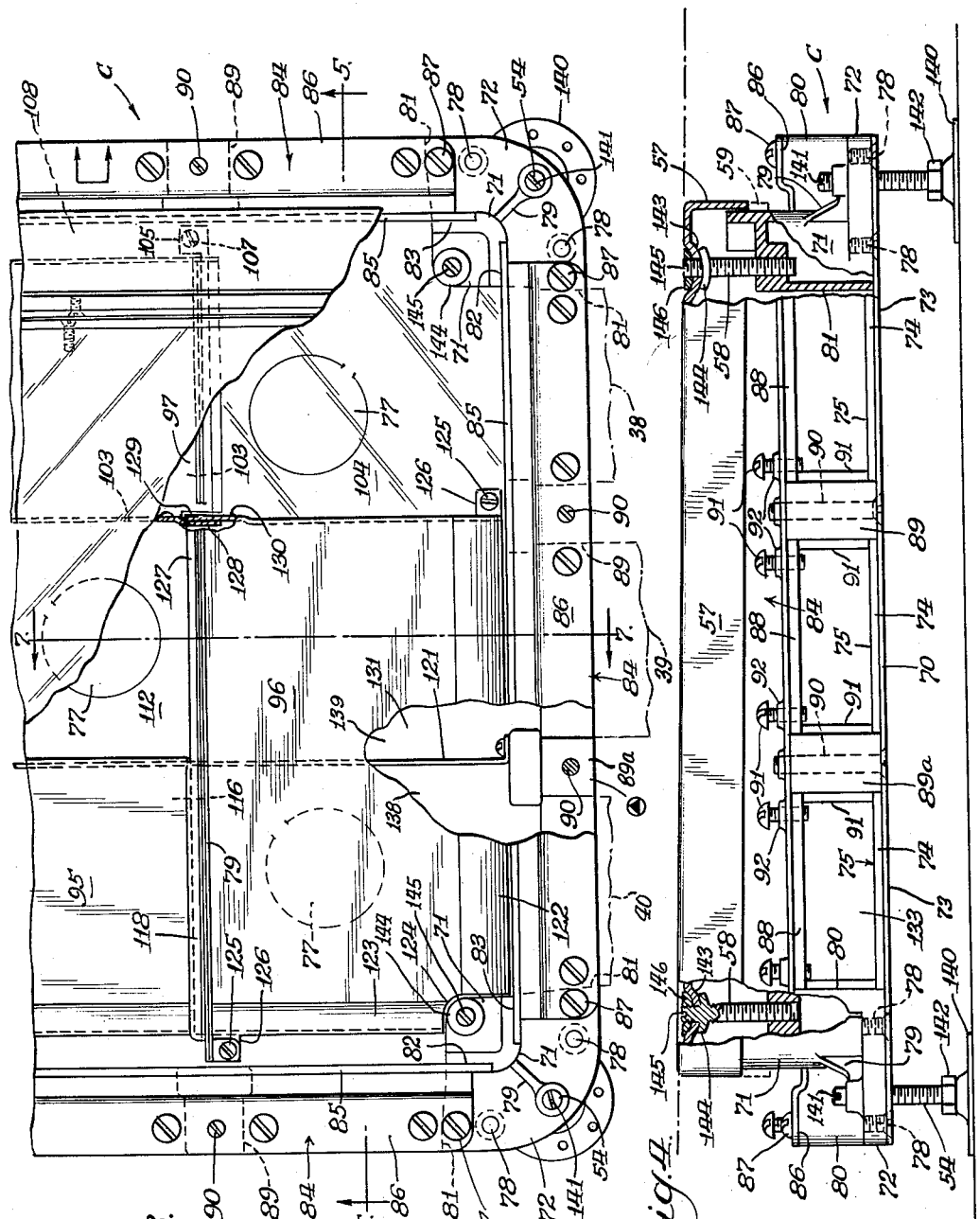

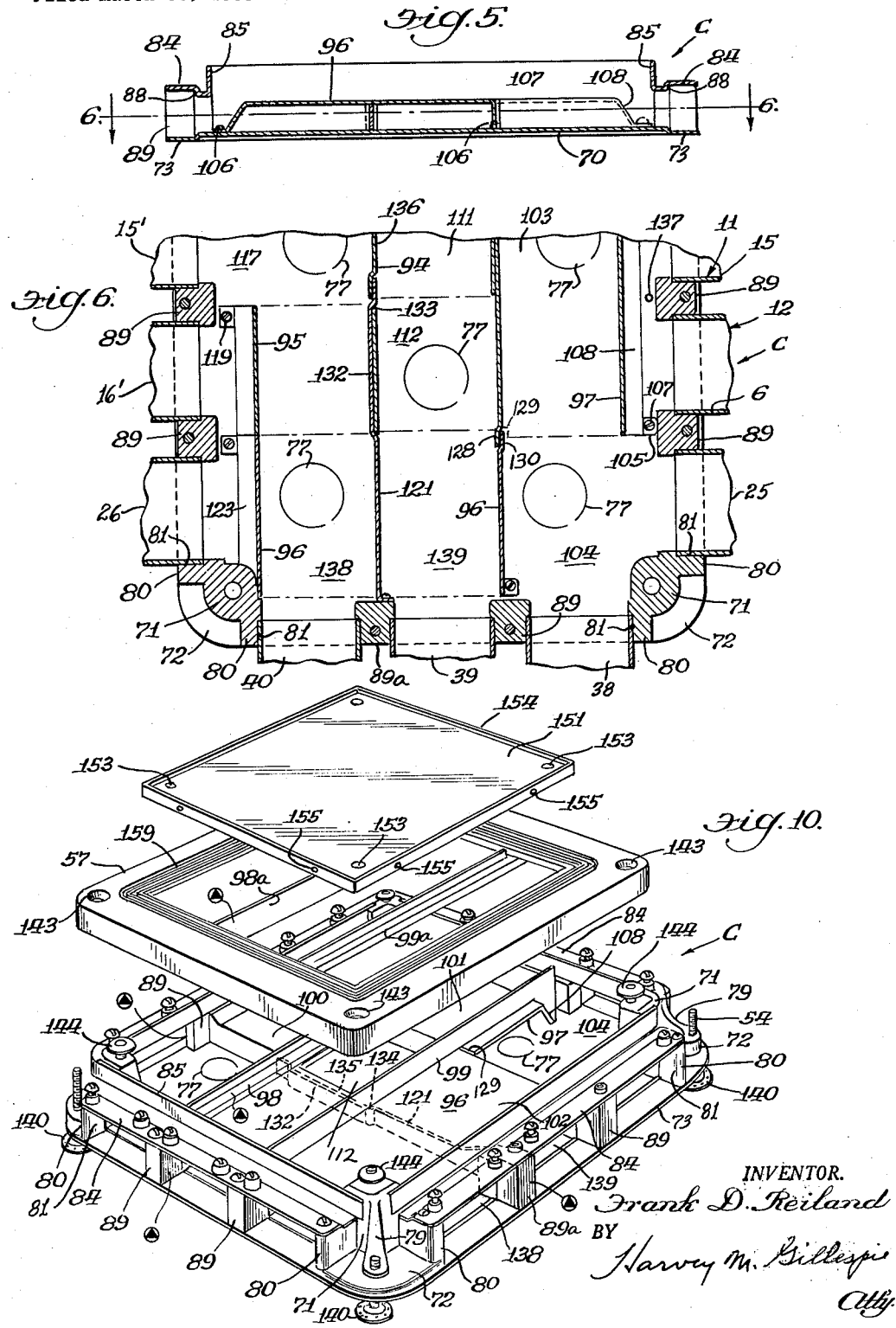

Oct. 30, 1962  F. D. REILAND  3,061,663
UNDER-FLOOR DUCT SYSTEM FOR ELECTRICAL WIRING
Filed March 30, 1959  7 Sheets-Sheet 6

INVENTOR.
Frank D. Reiland
BY Harvey M. Gillespie
Atty.

Oct. 30, 1962   F. D. REILAND   3,061,663
UNDER-FLOOR DUCT SYSTEM FOR ELECTRICAL WIRING
Filed March 30, 1959   7 Sheets-Sheet 7
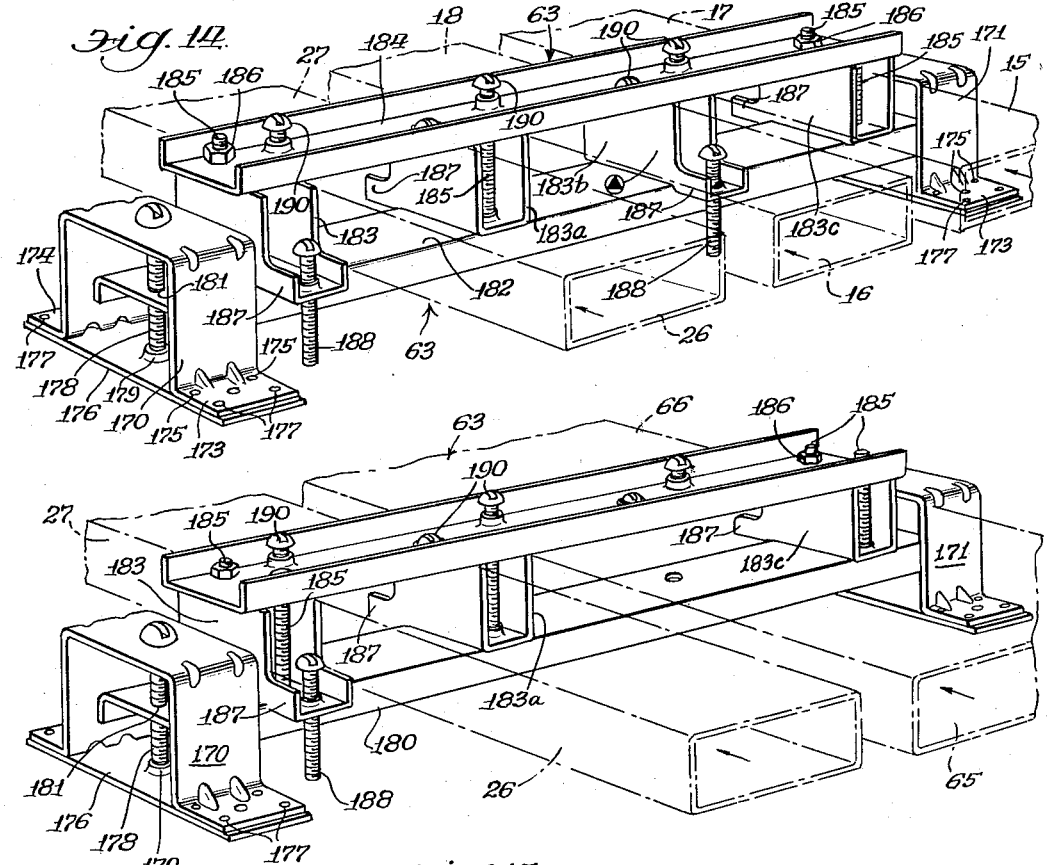
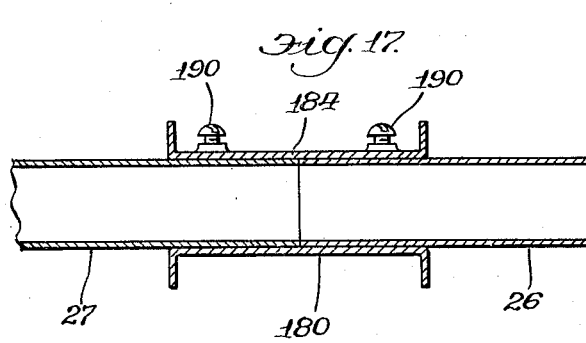
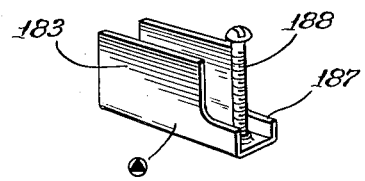
INVENTOR
Frank D. Reiland
BY
Harvey M. Gillespie
Atty.

United States Patent Office 3,061,663
Patented Oct. 30, 1962

3,061,663
UNDER-FLOOR DUCT SYSTEM FOR ELECTRICAL WIRING
Frank D. Reiland, Chicago, Ill., assignor, by mesne assignments, to Square D Company, Park Ridge, Ill., a corporation of Michigan
Filed Mar. 30, 1959, Ser. No. 802,723
12 Claims. (Cl. 174—49)

This invention relates to improvements in under-floor duct systems for distributing electrical wiring to various locations within a building. Such systems generally comprise a network of junction boxes, ducts, or races for connecting the boxes, and conduit supporting means, all of which are embedded in the concrete floors of the building.

It is desirable, in under-floor duct systems of the above character, that the electrical circuits of different potential be housed in separate ducts or races so that the several groups of circuits, for example circuits for lighting and power machine operation, low voltage signaling circuits, and telephone circuits, can be readily identified by the ducts in which they are respectively located. Duct systems herefore proposed and now in general use are provided with ducts of uniform size for housing the various electrical circuits. Consequently, overcrowding of a single duct makes it necessary to use more than one duct for housing the wiring of circuits having the same potential. The separation of the wiring of the same potential into separate ducts results not only in confusion of the circuits, but also increases the number of outlet fittings to make the circuits in each duct available at predetermined locations and also interferes with the economical use of the wires contained in the separate ducts.

A principal object of the present invention is to overcome the above mentioned and other objections present in prior under-floor duct systems. In this connection, the present invention provides a duct system in which the constructions of certain junction boxes and certain of the duct supporting devices are variable to accommodate ducts of different sizes and consequently of different capacities, whereby large volumes of wiring of the same service or voltage classification may be enclosed within the same duct.

According to the present invention, interconnected junction boxes of improved constructions are arranged in like oriented relation in the system and by virtue of their orientation facility for alternative constructions present novel cooperative relationships whereby the ducts connecting adjacent boxes may be of uniform size or of different sizes to accommodate the volume of wiring to be housed in the individual ducts at different locations in the system. For example, if the volume of wiring for a specified voltage classification is greater than normal in a given area of a building, certain of the junction boxes and duct supports may be altered to accommodate one or more larger ducts instead of two or more ducts of the so-called standard size.

All junction boxes which have plural openings in respective side faces thereof are provided with separable spacing elements which cooperate with the top and bottom portions of the box to define the plural openings for receiving the ends of ducts to be fitted into said openings. If it is desirable to utilize a larger duct for two ducts of standard size, a spacing element which normally separates the two standard size ducts is removed or omitted from the box, thereby providing the box with an opening equal in area to two standard ducts plus the area of the unused spacer element.

In the larger junction boxes, of the systems herein shown, for example boxes formed with three or more openings in a side for the reception of standard size ducts, the interior of each such box is provided with a plurality of separable partitions and partition tunnels which may be selectively embodied therein to divide the interior of the box into separate compartments and thereby simplify the direct and lateral coursing of the wires through interconnected boxes. The said partitions and tunnels also simplify the fishing of wires through a plurality of boxes in that they insure movement of the wires and/or fishing tape in the desired directions through the several boxes. The separable spacers, partitions and partition tunnels are assembled in each box in accordance with a specific design and orientation of the box in the system. Therefore, in order to avoid error or confusion in the assembly or alteration of the box, the said removable elements are code marked by suitably colored paint or other markings so that the coded elements only will be removed when the box is altered during the installation of the system to accommodate one or more of the larger ducts.

In order to facilitate cross-overs of the ducts, certain of the junction boxes are provided with duct receiving openings at different levels. Also, all of the boxes are adjustable vertically to accommodate concrete slabs of different thickness. The top portion of each junction box is also adjustable relative to the base so that it can be made to conform to the surface plane of the concrete slab or floor in which the box is embedded.

In combination with the selectively variable constructions of the junction boxes for accommodating a plurality of ducts of the same or of different sizes, the invention provides duct supporting devices to be located at spaced locations along a group of ducts connecting adjacent boxes. The basic construction of each supporting device may be selectively varied to accommodate changes in the number and size of ducts in a given group with which it is associated. They are also adjustable vertically to accommodate the specific elevation of the ducts, as in the case of cross-overs or when the ducts enter the higher level openings in a two-level junction box.

This invention is illustrated in certain preferred embodiments in the accompanying drawings wherein:

FIG. 1 is a fragmentary view in perspective of an under-floor duct system constructed in accordance with the present invention;

FIG. 2 is a similar view of a duct system in which the junction boxes shown in FIG. 1 are positioned in the same oriented relation to each other as shown in FIG. 1, but in which the boxes are interconnected by means of ducts of different sizes;

FIG. 3 is a fragmentary plan view of the junction box designated C in FIG. 1, the top and portions of the interior elements thereof being broken away to better illustrate the interior structure;

FIG. 4 is a side view, partly in section, of the junction box shown in FIG. 3;

FIG. 5 is a cross sectional view taken on line 5—5 of FIG. 3;

FIG. 6 is a fragmentary sectional view taken on line 6—6 of FIG. 5 to illustrate an interlocking engagement of a removable partition wall element with certain side walls of associated tunnel elements;

FIG. 7 is a sectional view of a junction box taken substantially on lines 7—7 of FIG. 3, but including the entire width of the box and also illustrating duct elements secured in the duct receiving opening of the junction box;

FIG. 8 is a fragmentary view, in perspective, showing a portion of the removable cover plate and the cover ring of a junction box together with built-in tile trim strips associated therewith, the latter being in their initial inverted positions which they occupy prior to the laying of the floor covering;

FIG. 9 is a fragmentary view, in perspective, showing the junction box cover ring and closure plate and the built-in tile trim strips arranged in their normal positions to serve as metallic edgings for the floor covering;

FIG. 10 is a view, in perspective, of the said junction box C, the cover ring and closure plate elements of the box being detached from the base portion thereof and elevated in respect to the base so as to reveal the interior partitions and tunnel elements of the box structure;

FIG. 14 is a perspective view of a combined duct coupler and adjustable supporting structure taken from the viewpoint of line 14—14 of FIG. 1 to illustrate the structure in connection with ducts of uniform width;

FIG. 15 is a view similar to FIG. 14 but is taken from the viewpoint of line 15—15 of FIG. 2 to show the structure altered to support ducts of different widths and thereby illustrate one of its cooperative functions in connection with the junction boxes of the system;

FIG. 16 is a perspective view of one of the removable duct separators of the duct supporting structure; and FIG. 17 is a fragmentary cross-sectional view of the elements 180 and 184 of FIG. 14 to illustrate the manner in which these elements overlap and support the abutting ends of contiguous duct sections.

Figure 11:
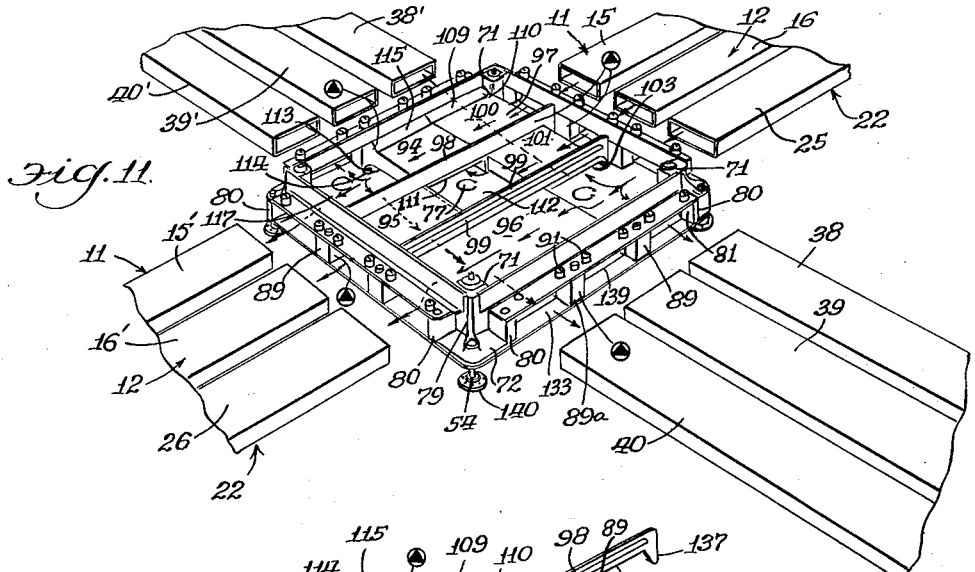
FIG. 11 is a view similar to FIG. 10 with the cover ring and closure plate elements completely removed from the base structure and showing also the interior partitions and tunnel elements in their normal positions to accommodate ducts of standard size.

With reference to FIG. 1 of the drawings, wherein an under-floor duct system is shown composed of ducts of uniform size for distributing electrical wiring of different potentials to various zones or floor areas of a building, the specific network of ducts is intended merely as an illustration and not as a limitation, since the number and size of ducts in a system are determined by the volume of wiring and the number of voltage classifications to be used in a specified building. However, in any installation, the ducts, junction boxes, and other associated structures of the system are adapted to be embedded in the concrete floor 10 of the building. According to the improved duct system disclosed in FIG. 1, a plurality of junction boxes are arranged in predetermined oriented relation to each other. For example, the forward faces (the East faces) of all boxes face in the same direction and are parallel to each other. The several junction boxes are identified, respectively, by the reference characters A, B, C, C', D, E, F, G and H, and are interconnected by means of the ducts, hereinafter identified.

In actual practice all boxes in the system are code marked by applying paint of the same color to a predetermined side portion of each box, but for the purpose of identification in the present application, these side portions are identified by pairs of connected arrows. The said code marking of the boxes assists the workmen in locating the boxes in their necessary oriented relation to insure proper cooperative relation of the ducts and interconnected boxes.

A pair of ducts designated generally by the reference numerals 11 and 12 and composed of a series of parallel duct sections 13—14, 15—16, 15'—16', 17—18 and 19—20, lead from a conventional service wiring cabinet 21 through a plurality of junction boxes including the said boxes A, C, and D to a pair of upper level duct receiving openings provided in the forward face (East face) of junction box G. A third duct designated generally by reference numeral 22 and composed of a plurality of duct sections 23, 24, 25, 26 and 27 leads from the said service wiring cabinet 21 to a duct receiving opening in the forward face of junction box E. A further duct section 28 interconnects the junction box E with an upper level opening of junction box G. Additional duct sections lead out of the opposite face (West face) of junction box G and extend to other parts of the system. The said duct 24 is in the form of an under-pass connector providing a passageway beneath a pair of transverse ducts 29 and 30 the latter of which connect the box A with a pair of upper level openings in the North face of junction box B. It will be understood, however, that the duct section 24 may be inverted to pass over one or more transverse ducts in situations where an overpass may be desirable. A duct designated generally by the reference numeral 31, comprising a plurality of series connected sections 32, 33, 34, and 35, leads from a source not shown through the lower level openings of junction boxes B and F and is connected by interconnected elbow section 36 and a duct section 37 with a lower level duct receiving opening in the "South" face of junction box G.

The junction box C' is the same in construction as junction box C and is connected to three openings in the South face of the latter by means of ducts 38, 39 and 40. Similar ducts 38', 39' and 40' extend from the North face of the box C to other parts of the system. A plurality of duct sections shown fragmentarily at 41 and 42 lead from a source, not shown, into duct receiving openings formed in the East face of box C' and a similar group of duct sections 41', 42', 43' connect its West face with openings in the East face of the box H. The box H is larger than boxes C, C', since each side face of the box H is formed with four openings for receiving standard size ducts. Three of said openings receive said duct sections 41', 42', and 43'. A fourth opening on the East face of box H receives a duct 44 which may lead from an electrical cabinet or other source not shown. A single duct section 45 is shown leading from one opening in the North face of box H to one opening in the South face of box F. The other openings (not shown) in the said North face of box H may be closed by suitable closure plates or plugs. A duct section 46 leads from the North face of box F to an opening in the South face of box E. The latter box, as previously described, is interposed between the duct sections 27 and 28.

All duct sections shown in FIG. 1 are rectangular in cross-section and, with the exception of duct sections 48, 49, and 50, are of uniform size and, for the purpose of convenient terminology, are identified herein as ducts of standard size.

All ducts of the system are formed at predetermined spaced locations with access openings provided with improved tubular inserts 51 fitted therein. These inserts extend from the tops of the ducts upwardly through the concrete flooring 10 substantially as disclosed and claimed in my co-pending application Serial 760,961, filed September 16, 1958. Selected insert tubes 51 serve as connection ducts leading from an under-floor duct to an outlet housing 52 or 53, as the case may be. The said housing structures include improved terminal contact mounting structures therein and constitute subject matter disclosed and claimed in my co-pending application Serial No. 822,543, filed June 24, 1959, now Patent 3,047,650. It may be mentioned at this time that in some instances the housings 52, 53 may be provided with sockets 55 for receiving the tangs of one or more cord plug attachments (not shown) and in other situations the housings, for example housing 53, may be formed with an opening 56 to receive an electrical cable composed of a number of wires adapted to be connected to a plurality of electrical contacts enclosed within the housing.

All junction boxes of the system are completely assembled and located in their proper positions before the concrete floor 10 is poured. They may be positioned on any available fixed element of the building, for example on the forms for holding the wet concrete or on the permanent framework of the building. Each junction box is provided with adjustable leveling screws 54. Consequently all boxes of the system may be adjusted to bring their duct receiving openings to predetermined levels. The cover ring portions 57 of all junction boxes may also be adjusted vertically independently of the leveling screws 54. Consequently the top ring and closure plate elements of all boxes, in a manner to be presently described, may be brought into alignment with the top surface of different thicknesses of the concrete floor without disturbing the adjustment of the leveling screws 54 which determine the cooperative elevations of the duct receiving openings of the box. This adjustment of the cover ring is effected by means of adjusting screws 58, shown in FIGS. 1, 2, and 4. If the top surface of the concrete floor is higher in the region of one or more junction boxes than in the region of others, the junction boxes located in the thicker portions of the concrete may be provided with top ring elements of additional height, as indicated in dotted lines at 59 in FIG. 4.

The several ducts for housing the electric wires and for interconnecting the several junction boxes are adjustably supported at locations intermediate adjacent boxes at levels corresponding to the levels of the duct receiving openings of the junction boxes. In some instances the vertical adjustment of an individual duct may be effected by adjustment of screws associated with certain duct elements, for example the screws 60 associated with the elbow 36 associated with duct section 35 or the screws 61 associated with elbow section 62 connected to the duct 44. At other locations adjustable supporting devices 63, 64 are provided for supporting the ducts intermediate the junction boxes. The construction of the supporting devices 63 will be hereinafter fully described in connection with FIGS. 14 and 15. It will suffice at the present to say that the said supporting devices are so constructed that they include vertically adjusted portions which support the duct elements at the elevation necessary to cooperate with the adjusted elevation of the junction boxes.

In some installations, the wiring for one voltage classification may be more voluminous than can be conveniently housed in a single duct of standard size. If this condition is known before the material for the system is assembled, suitable alterations of the junction boxes and duct supporting devices can be readily made at the factory to accommodate larger ducts by simply omitting certain of the structural elements of the junction boxes and the duct supporting devices. However, if such condition becomes known only during the installation of the system, the necessary alterations of the junction boxes and duct supporting devices can still be made quite readily by merely removing certain of the partitions, tunnels and spacer blocks of the junction boxes and certain of the spacers of the duct supporting devices. In order to facilitate this alteration of the junction boxes and duct supporting devices and to avoid possible confusion, the several parts which are removable to effect such alterations are code marked. In practice the code marking is effected by painting the removable elements a distinctive color. However, each removable part is identified in the present application by a triangle enclosed in a circle.

With reference to FIG. 2 of the drawings, the duct system therein shown is similar to the system shown in FIG. 1 but utilizes certain ducts of larger size. That is to say, the system shown in FIG. 2, instead of utilizing ducts of uniform size, is composed of ducts of different sizes. The modifications necessary to utilize the larger ducts shown in FIG. 2 have been made so that a large duct 65 may be substituted for the two ducts 15 and 16 shown in FIG. 1. The said duct 65 has a cross-sectional area equal to the cross-sectional areas of the two standard ducts 15 and 16 plus the area of the removable spacers bearing the code marking (a triangle enclosed in a circle). Similar substitutions of the larger ducts designated 66, 67, 68, 69, 69a, 65a, 66a, 68a, and 68b have been made for the respective pairs of standard ducts designated in FIG. 1 by reference characters 15′, 16′; 17, 18; 19, 20; 29, 30; 39, 40; 41, 42; 41′, 42′; 29′, 30′; and 39′, 40′. In such case, spacers bearing the code mark and associated with the junction boxes A, B, C, C′, D, G and H and the duct supporting devices 63 have been removed to enable the junction boxes and supporting devices to accommodate the wider ducts shown. The standard size ducts shown in FIG. 2 are the same as the correspondingly numbered ducts shown in FIG. 1.

In order to utilize the wider ducts 65, 66, 67, 68, 69, 69a, 65a, 66a, 68a, and 68b of FIG. 2, it is necessary, in addition to removing the code marked duct spacers shown in FIG. 1, to also remove certain of the vertical partitions and partition tunnels, embodied in the interior of the junction boxes A, C, C′ as well as from any larger boxes which may be embodied in a given duct system.

The necessary omission or removal of interior structures of the junction boxes will be best understood after having a thorough understanding of the internal constructions of certain junction boxes, for example, the box C shown in FIG. 1 in connection with the standard ducts. Therefore, the junction box C will be described as an example of similar types of boxes to show the constructions and functions of the internal parts thereof. Thereafter the alterations necessary to utilize the larger ducts 65, 66, 67 and 68 will be described.

With reference to FIGS. 3 to 11, inclusive, of the drawings in which the junction box C is illustrated, the said box comprises a rectangular bottom plate 70 provided at each of its four corners with a corner post 71 having a base flange 72 suitably secured to the downwardly offset marginal portion 73 of the base plate 70, shown best in FIGS. 2, 5 and 10. The said offset marginal portion 73 provides the base plate 70 with an upwardly projecting stop shoulder 74 for limiting the insertion of the ducts into the side openings of the box and to also bring the top surface 75 of the base plate into smooth connecting relation with the inner face 76 of the ducts entering the box (see FIG. 7) and thereby promote free movement of the wires and fishing tape across the connections of the ducts with the box structure. The said base or bottom 70 of the box is preferably made of metallic plate material as distinguished from cast metal so as to provide the necessary strength and tenacity to withstand the pressures to which it is subjected in service and to also permit the formation therein of a series of "knock-out" discs 77, whereby access openings may be readily formed through the bottom of the box when such openings are desirable. The corner posts 71 are made of cast metal and are secured to the base plate 70 by a pair of stub screws 78. Each post is reinforced by a central web 79 and a pair of side columns 80. Each column 80, in addition to rigidifying the central portion of the post 71, defines one side face 81 (see FIGS. 3, 6 and 10) of an opening for receiving a duct section, for example duct sections 15, 25, 15′, 26, 38, 40, 38′, and 40′, shown best in FIGURES 1, 3, 6, and 11. Each corner post is formed with a pair of recesses 82, 83 which extend upwardly from the columns 80 to the upper end of the post. Each recess provides a seat for an end portion of a vertical flange of an angle bar which bridges the space between opposed corner posts. Each angle bar is designated generally by the reference numeral 84 and includes a vertical flange 85 and a horizontal flange 86. The opposite ends of said flanges 85 fit into the recesses 82 and 83 of opposed corner posts 71 and the horizontal flanges 86 of the bars are secured by screws 87 threaded through the flanges and into the upper ends of columns 80 of opposed corner posts. The horizontal flange 86 of each angle bar 84 is depressed adjacent the vertical flange 85 (see FIGS. 4 5 and 7) to provide an upper stop shoulder 88 which extends throughout the length of said lower flange and cooperates with the lower stop shoulder 74 to limit the extent to which an associated duct can be inserted into the junction box. Spacer elements 89, 89a (see FIGS. 3, 6, 10 and 11) are positioned along each side of the box in the space between the angle bars 84 and the base plate 70 and are secured in place by screw bolts 90. The said spacers are located between adjacent ducts and serve to hold them in spaced relation. The opposite side faces of each spacer are formed with lateral stop shoulders 91 which cooperate with said shoulders 74 and 88 to limit the applying movement of the ducts and prevent the sharp edges of the ducts from scraping the insulation off the wires as the latter are pulled through the ducts. The top and bottom faces of the spacers 89, 89a conform to the transverse contour of the horizontal flange 86 of the angle bar 84 and the offset marginal portion 73 of the base plate 70. Consequently, the stop shoulders 74 and 88 serve to limit the applying movement of the spacers. The said spacers serve in combination with the angle bar 84, the base plate 70, and an opposing spacer 89, 89a or a vertical column 80 of a corner post to define the width of an opening for receiving a duct associated with the junction box. The several ducts when inserted in the several duct receiving openings of a junction box (FIG. 7) are secured therein by screws 92 threaded through embossed portions 93 of the angle bars 84.

The interior of each junction box C is provided with a plurality of tunnel elements 94, 95, 96 and 97 in the form of inverted channels removably secured to the base plate 70 and providing a series of passageways adjacent the said base plate for directing the electrical wiring (either spliced or otherwise) through the box from one duct to another. A plurality of parallel vertical partitions 98, 99 are positioned above the said tunnel elements to provide upper passageways 100, 101 and 102 extending over the tops of the said tunnels and direct wires through the box from a duct at one side thereof into one or more ducts at another side of the box.

The tunnel element 97 has its entrance in the North side of the box and provides a channel 103 leading from the duct 38′ into a splicing compartment 104 communicating with the ducts 25 and 38, respectively (see FIGS. 1, 3 and 6). The tunnel is provided at diagonally opposed corners with attaching lugs 105, 106 (FIGS. 3, 6, 12 and 13) which are secured to the base plate 70 by means of screws 107. The forward face 108 (FIGS. 5, 6 and 10) inclines downwardly and forwardly to provide a ramp-like surface to insure movement of the wires and/or fishing tape up and over the top of the tunnel 97. The end of this tunnel which communicates with the duct 38′ is flared upwardly at 109 (FIGS. 11, 12 and 13) to the top of the opening for receiving the duct 38′. The corner portion 110 of the tunnel element adjacent the corner post 71 of the box is cut away in the same manner as hereinafter described in connection with the corner portion 124 of tunnel 96 so as to fit snugly around the adjacent inner faces of the corner post.

Figure 12:
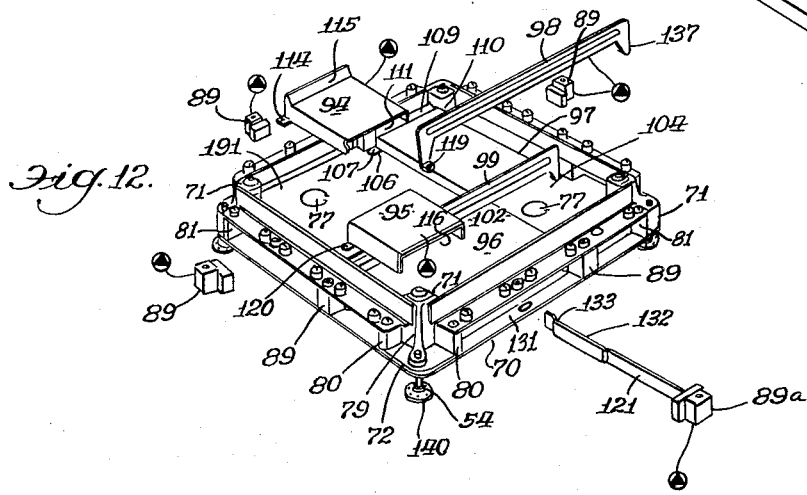
FIG. 12 is a perspective view showing the junction box of FIG. 11 but illustrating certain dividers, a partition wall and a pair of tunnel elements detached from the base portion of the box and elevated above the same so as to better illustrate the removability of these elements from a basic construction of a box to accommodate duct sections of different widths.

The tunnel element 94 is positioned at one side of the tunnel 97 and provides a passageway 111 leading from the duct 39′ into a centrally located splicing compartment 112. It is secured to the base plate 70 by means of a screw 113 threaded through an attaching lug 114 (FIGS. 10, 11 and 12). The outer end 115 of this tunnel element is flared upwardly (as shown in FIGS. 7, 11 and 12) to the top of the opening for receiving the duct 39′.

The tunnel element 95 provides a passageway 116 leading from a corner splicing chamber 117 into the open end of the connecting tunnel element 96. The edge 118 of the tunnel section 95 overlaps a portion of the tunnel 96 (FIGS. 3 and 7) and the tunnel is secured to the base plate 70 by means of a screw 119 threaded through an attaching lug 120 (FIGS. 7 and 12). The side of the tunnel 96 adjacent the opening in the box for receiving the duct section 26 is inclined downwardly to provide a ramp-like surface 123 for guiding the wires up and over the top of the tunnel. The said tunnel element 95 is further maintained in its position by virtue of its interlocked engagement with a removable divider wall 121 associated with tunnel 96 (FIGS. 6, 10 and 12) to be presently described.

The tunnel 96 extends across the two openings in the South end of the box which receive the ducts 39 and 40. The top wall of the tunnel is flared upwardly at 122 (FIGS. 3 and 7) to the tops of the openings which receive the said ducts 39 and 40 (FIGS. 6 and 11). The side wall 123 inclines downwardly to the base plate 70 so as to provide a ramp-like surface for guiding the wires up and over the top of the tunnel 96. The corner portion 124 of the tunnel element (FIG. 3) is cut away to fit over the adjacent side faces of a corner post 71 in the same manner as the portion 110 of the tunnel 97 fits around a similar corner post 71. This tunnel is otherwise secured in position by means of screws 125 threaded through attaching lugs 126 and into the base plate at diagonally opposed corners of the tunnel element. The corner 127 is also interlocked with the corner 128 of tunnel element 97 by virtue of a recess 129 formed in the top of tunnel element 97 for receiving an offset portion 130 of a side wall of the tunnel element 96. The relative wide passageways 131 (FIGS. 3, 12 and 13) defined by the tunnel element 96 is sub-divided into two passageways 138, 139 (FIGS. 3 and 11) by means of the dividing partition 121 which is secured at one end to a spacer block 89a. The other end of the divider partition is offset, as indicated at 132 (FIGS. 6, 10 and 12), to provide a shoulder 133 (see FIGS. 7 and 10) for interlocking with the vertical edge 134 of side wall 135 of tunnel 95 and also overlaps the inner face of the side wall 136 of tunnel element 94.

The tunnel elements 94, 95 and 97 are further secured in position by means of the overlying partition 98 the opposite ends of which extend downwardly along the inclined walls of tunnels 95 and 97. The lower ends of the element 98 are turned laterally to provide attaching lugs which are fastened, by means of screws 119 and 137 (see FIGS. 6, 7 and 12). The lower ends of partition 99 are turned laterally and fastened to the base plate 70 by screws 109 and 125 (see FIGS. 3, 6 and 7). The sub-division 138 of the passage 131 serves as a continuation of the passage defined by the tunnel element 95 and, therefore, connects the duct 40 with the splicing compartment 117 and the duct 40′. The other sub-division 139 of the passageway 131 connects the duct 39 with the splicing chamber 112 and thence through the tunnel 94 with the conduit 39′.

Before describing the further constructions of the junction box, it is desirable to indicate at this time the manner in which the wires from the ducts 11, 12 and 25 are coursed through the various passageways defined by the cooperating tunnel elements and partitions to the various ducts connected with other sides of the junction box. In this connection it will be observed by inspection of FIG. 11 that wires leading from the duct 11 into the box are passed up and over the tunnel elements 97 and 94 to the splicing compartment 117. Certain of the wires may continue a direct course into the duct section 17 while other wires may be turned left either by splicing or otherwise through the tunnel 95 and passageway 138 of tunnel 96 to duct 40 and certain other wires may be directed to the right from said splicing compartment 117 into duct 40′. The wires entering the junction box from section 16 of duct 12 are coursed through the passage 101 between the partitions 98 and 99 to the splicing chamber 112. Certain of these wires may pass up and over the top of tunnels 95 and into the duct section 18. Other wires from the said duct section 16 may be turned either left or right at the splicing compartment 112 through the channel 139 of tunnel 96 into duct 39 or through a channel defined by tunnel 94 into the duct 39′. The wires entering the box from duct 25 may be coursed up and over the tunnel element 96 and thence downwardly into duct section 26. Other wires may be turned either left or right from the splicing compartment 104. The wires turned left will enter duct 38 and those turned right, either by splicing or otherwise, will pass through the passageway 103 of the tunnel 97 and into the duct 38'. It will be understood, of course, that any of the wires passing through the passageways within the junction box may, if desired, be directed through outlet openings formed in the base plate 70 by knocking out one or more of the discs 77. These bottom openings may also serve as admission openings for additional wiring if and when it is desirable to add to the wiring at any location in the system.

With reference to the vertcial adjustment of the box by virtue of the leveling screws 54 and by virtue of the adjustable cover ring 57, a leveling screw 54 (shown best in FIGS. 3 and 4) is located at each corner of the box. It extends upwardly through a foot element 140 and is threaded through the flange 72 of the adjacent corner post casting 71. The upper end of the screw is slotted at 141 to receive the bit end of a screw driver and the adjustment of the screw is locked in position by means of a jam nut 142 which abuts against the foot member 140. The cover ring 57 is provided with downturned side flanges which telescope over the upstanding flanges 85 of the several angle bars 84 and over portions of the corner posts 71, as shown best in FIG. 4. The portions of the cover ring 57 at locations surrounding each adjusting screw 58 are formed with depressions 143 which provide a concave upper surface or cup and a lower convex surface the latter of which seats on a concave collar 144 of the screw 58, whereby the cover ring 57 may assume various positions relative to the vertical axis of the adjusting screws 58. The upper ends of the screws 58 are slotted at 145 to receive the bit end of a screw driver, whereby the screws may be readily adjusted in the corner posts 71. A threaded nut 146 having a convex bottom surface corresponding to the concavity of the depression 143 serves to lock the screw 58 in any desired position. By the cooperation of the leveling screws 54 and the adjusting screws 58 the top surface of the cover ring 57 may be raised to any desired level to bring it into alignment with the level of the concrete floor 10. Inasmuch as the cover ring 57 may be moved upwardly with respect to the upper edges of the partitions 98 and 99, additional partition sections 98a and 99a are secured to the under-face of the cover ring by screws 147 as shown best in FIG. 7. The partition sections 98a and 99a overlap the partitions 98 and 99 so as to prevent the wires from passing from one of the upper passageways 100, 101 and 102 into another during the movement of the wires through said passageways. The upper edges of the partition sections 98a and 99a are cut away adjacent the attaching flanges so as to conform with the downwardly offset inner marginal portion 149 of the cover ring 57.

The opening defined by the inner perimeter 150 of the cover ring 57 is closed by a removable cover or closure plate 151. The plate seats on a gasket 152 (see FIG. 7) suitably bonded to the upper face of the depressed inner marginal portion 149 of the cover ring 57. The cover plate may be clamped in place by screws 153 (see FIG. 10). Four trim strips 154 are secured respectively by screws 155 to the edge faces of the cover plate 151 so that the upper edges 156 thereof project above the plate (see FIGS. 7 and 9) and coincide with the top surface of a floor covering 158 which overlies the top portion 157 of the cover plate. Cooperative trim strips 159 are secured by screws 160 to bars 161 arranged on the depressed flange 149 of the cover ring 57. The trim strips 159 when in their normal position project upwardly to a position flush with the top surface of the floor covering 158, and cooperate with the trim strips 154 to provide parallel metallic edgings for the floor covering in the region of the junction box.

In order to prevent the metallic trim strips 154 from being scuffed or marred during shipment or during the general floor construction, the closure plate 151 with its trim strips 154 may be inverted and secured in the latter position by screws 153. The trim strips 159 may also be protected during shipment by being installed temporarily on the bars 161 in a lower inverted position as shown in FIG. 8, the difference in elevation from the position of FIG. 9 being effected by the vertical eccentricity of the holes in the trim strips 159 for receiving the screws 160. Any type of floor covering including ceramics, woods or plastics, may be used, the height of the trim strip being made in accordance with the thickness of the floor covering to be used.

With reference to the duct supporting devices 63 and 64 (see FIG. 1), these devices serve as connecting sleeves for abutting ends of the duct sections containing the wiring of the system and also maintain the ducts at elevations corresponding to the elevation of the duct receiving openings of the junction boxes. Each supporting device 64 is designed to adjustably support a single duct of standard width in its proper position in the system, but each device 63 is designed to adjustably support a plurality of such duct sections. However, inasmuch as the adjustable constructions of both devices are generally the same, it is deemed sufficient for a clear understanding of both devices and their functions to describe herein the structure 63 for adjustably supporting a plurality of duct sections. For this purpose, attention is directed to FIG. 14 of the drawings wherein one assembly of the duct supporting device 63 is shown. The device comprises a pair of spaced apart end supports 170—171 comprising in each case an inverted U-shaped member, the lower ends of which are turned in opposite directions to provide feet 173 and 174 for attachment by means of spot welds 175 or other suitable fasteners, to a base plate 176. The attachment feet of the supports 171, 172 are provided with suitable openings 177 of different diameters suitable for receiving conventional fastening devices including wood or metal screws, concrete nails, or other fasteners for securing the supports in proper position. Each support 170, 171 is provided with a vertically extending screw 178 which is journalled at 179 in the base plate 176 so that it may be rotated freely in the support. A bridge member 180, preferably, though not necessarily, inverted channel shape in cross-section, extends across the space from the support 171 to 172, the opposite sides of the bridge being movably supported in sliding contact with the vertical leg portions of the end supports. The said bridge 180 is provided with threaded openings 181 at opposite ends to receive the vertical screws 178. It will be observed, therefore, that rotation of the screws 178 at opposite ends of the support structure will change the elevation of the bridge 180 so that the top face 182 of this bridge member will coincide with the elevation of the depressed marginal portion 73 of the base plate 70 of associated junction boxes and thereby support the ducts associated with the supporting device in horizontal alignment with the duct receiving openings of the junction boxes of the system. A plurality of spacer blocks 183, 183a, 183b, and 183c are arranged on the top surface 182 of the bridge member 180. The spacer blocks are spaced from each other distances equal to the width of the standard duct section and support a top bar 184, which for the purpose of providing rigidity is made channel shape in cross-section. The said spacer blocks 183, 183a, 183b, 183c, and the top bar 184 are clamped securely to the bridge 180, by means of clamp bolt assemblies comprising bolts 185 which extend upwardly through the bridge 180, spacer blocks 183, 183a, 183b, 183c and cross bar 184 and are secured in position by means of nuts 186 engaged with the threaded upper end of the bolts. The said bolts 185 are arranged along opposite sides of the bridge 180 and top bar 184, as shown best in FIG. 14. The spaces defined by the bridge member 180, the spacer blocks 183, 183a, 183b and 183c and the top bar 184 corresponds to the width and height of a duct section of standard width and these items cooperate to provide sleeves which overlap the abutting ends of adjacent ducts and thereby function as connecting sleeves therefor, as shown best in FIG. 17 of the drawings. The said spacing blocks are preferably of U-shaped configuration and each is provided at one end with an extension 187 through which a screw 188 is threaded. The screws 188 are of such length that they may be turned down to engage the form for the concrete slab and thereby provide additional rigidity for the opposite faces of the duct supporting device. The duct sections are secured in the spaces between the spacer blocks 183, 183a, 183b and 183c by means of fastening screws 190 which, in addition to securing the duct sections in their proper positions, serve to electrically ground the ducts.

During the assembly of the ducts, the top bar 184 is normally removed so that the ducts can be readily applied in their respective positions between the spacing blocks 183, 183a, 183b and 183c. The top bar 184 is then secured in its operative position and the fastening screws 190 are turned down to securely clamp the duct sections in the supporting structure and insure proper electrical grounding of the ducts.

In addition to the cooperative relation of the junction boxes and the duct supporting devices 63, 64 whereby the duct sections are maintained in alignment at proper elevations to accurately fit the duct receiving openings of the junction boxes and the supporting devices, a further cooperative relation is present by virtue of the removability of the spacers 89a of the junction boxes and the spacer blocks of the duct supporting devices 63 whereby the relatively wide duct sections 65, 66, 67, 68, 69, 69a, 65a, 66a, 68a, and 68b, shown in FIGURE 2, may be substituted respectively for the pairs of ducts 15, 16; 15', 16'; 17, 18; 19, 20; 29, 30; 39, 40; 41, 42; 41', 42'; 29', 30'; and 39', 40'. In this connection the spacer block identified in FIG. 14 with the code symbol (a triangle enclosed in a circle) is removed so that the spacing between the adjacent spacers designated 183a and 183b in FIG. 15 will correspond to the width of one of the wider duct sections 65, 66, 67, 68, 69, 69a, 65a, 66a, 68a, or 68b shown in FIGURE 2 of the drawings. The corresponding spacers 89a identified in FIGS. 1, 3, 4, 10, 11 and 12 by the code symbol (a triangle enclosed in a circle) are also removed from the several junction boxes to provide such boxes with a duct receiving opening of sufficient width to receive the wider duct sections shown in FIG. 2.

In a conversion of a duct system composed of duct sections of uniform widths to a system in which ducts of different widths are used, it is necessary, in order to insure proper coursing of the electrical wiring through the several boxes, from one of the wider duct sections to another, to remove the partition, tunnel elements, and tunnel dividers bearing the code mark. Therefore, when converting the system shown in FIG. 1 to the system shown in FIG. 2, the spacer 89 bearing the code mark and the spacer 89a and the tunnel elements 94 and 95 must be removed (see FIGS. 12 and 13). In such case the box structure will comprise a relatively large splicing compartment 191 together with the smaller splicing compartment 104 which remains the same as shown in FIG. 12. The removal of the code marked partition 98 provides the box with a relatively wide transverse passage 192 together with the passage 102, the latter of which remains unaltered.

Figure 13:
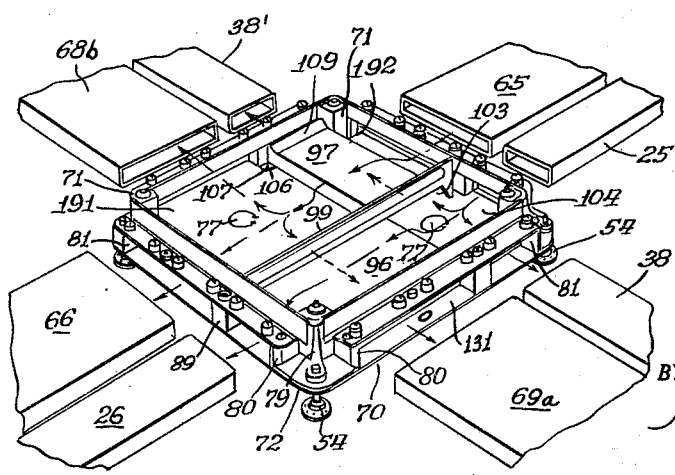
FIG. 13 is a further view, in perspective, of the junction box shown in FIG. 12 with the detached dividers, partitions and tunnel elements removed from the box and showing ducts of different widths positioned opposite the respective duct receiving openings of the box.

The conversion of the junction box to accommodate the wider duct sections, as shown in FIGS. 2 and 13, permits the wires entering the box from the wider duct section 65 to pass up over the tunnel member 94 to the splicing compartment 191. Certain of these wires may be continued through the splicing compartment through the duct section 65' at the opposite side of the box, while other wires may be turned to the right into duct section 67, or may be turned to the left from which the spacer partition 121 has been removed and into duct 67. The wires from duct section 25 into the splicing compartment 143 may be directed through the box to the duct sections 26, 38 or 38' in the same manner as described in connection with FIGURE 11.

I claim:
1. For use in an underfloor duct system for distributing electrical wiring in a building, a convertible junction box adaptable to receive a plurality of ducts of one size and alternatively to receive a duct of larger size, said junction box comprising an enclosure having an opening for receiving the ends of a plurality of ducts, and a separate spacer element removably secured in said opening for maintaining the ends of a pair of said ducts in spaced relationship, said spacer element being removable whereby said pair of ducts may be replaced by a single larger duct and the end of the larger duct received in said opening in place of said spacer element and the ends of said pair of ducts.

2. For use in an underfloor duct system for distributing electrical wiring in a building, a convertible junction box adaptable to receive a plurality of ducts of one size and alternatively to receive ducts of larger size, said junction box comprising an enclosure having a plurality of faces each of which is provided with an opening for receiving the ends of a plurality of ducts, and a separate spacer element removably secured in the opening in each face for maintaining the ends of a pair of said ducts received therein in spaced relationship, each spacer element being removable whereby said pair of ducts received in the opening in each face may be replaced by a single larger duct and the end of the larger duct received in said opening in place of said spacer element and the ends of said pair of ducts.

3. For use in an underfloor duct system for distributing electrical wiring in a building, a convertible junction box adaptable to receive a plurality of ducts of one size and alternatively to receive ducts of larger size, said junction box comprising an enclosure having a plurality of faces each of which is provided with an opening for receiving the ends of a plurality of ducts, a separate spacer element removably secured in the opening in each face for maintaining the ends of a pair of said ducts received therein in spaced relationship, and partition members within the box in cooperative relationship with said spacer elements and defining separate passageways leading from the ends of said pair of ducts received in the opening in each face to the ends of said pair of ducts received in the opening in each of the other faces, each spacer element being removable whereby said pair of ducts received in the opening in each face may be replaced by a single larger duct and the end of the larger duct received in said opening in place of said spacer element and the ends of said pair of ducts, and said partition members being removable whereby said separate passageways may be converted to a larger single passageway leading from the end of said single larger duct received in the opening in each face to the end of said single larger duct received in the opening in each of the other faces.

4. A junction box as claimed in claim 3, wherein certain of said partition members are tunnel-shaped elements each leading partially across the box from the opening in one of said faces.

5. A junction box as claimed in claim 4, wherein certain other of said partition members extend over the tops of said tunnel-shaped elements and define passageways extending transversely of said tunnel-shaped elements and leading from the opening in one of said faces to the opening in another of said faces.

6. A junction box as claimed in claim 5, wherein said spacer elements and partition members are code marked.

7. A convertible underfloor duct system for embedment in a concrete floor of a building and adapted to distribute electrical service wiring to various areas of the floor, said system comprising a plurality of convertible junction boxes oriented in predetermined relation to each other and each provided with a plurality of sides each having a duct receiving opening therein for receiving the ends of a plurality of ducts of one size and alternatively for receiving the end of a duct of a larger size, a separate spacer element removably secured in each of said openings for maintaining in spaced relationship the ends of a pair of said ducts of said one size received in the respective opening, and ducts of said one size for separately housing the service wiring of different voltage classifications, the ends of said ducts being fitted into corresponding of said duct receiving openings of adjacent boxes for establishing communication between the interiors of said boxes, and said spacer elements being removable whereby pairs of said ducts of said one size extending between adjacent boxes may be respectively replaced by single larger ducts.

8. An underfloor duct system as claimed in claim 7 wherein each junction box is provided with partition members defining passageways leading from an opening in one side of the box to an opening in another side and being of substantially the same width as said ducts of said one size, said partition members being cooperatively associated with said spacer elements and being removable whereby said passageways may be converted to a passageway of substantially the same width as said larger ducts.

9. An underfloor duct system as defined in claim 8 wherein certain of said partition members in each junction box are tunnels extending inwardly from an opening in one side of the box and the passageways defined by the inner surfaces of the tunnels communicate with splicing compartments which communicate with an opening in another side of the box.

10. An underfloor duct system as defined in claim 9 wherein another of said partition members in each junction box is a partition wall removably secured to the box in cooperative relationship with two of said spacer elements and extending over the top of one of said tunnels and partially defining a pair of individual passageways extending transversely of said tunnel and each connecting a splicing compartment in the box with an opening in a side of the box.

11. An underfloor duct system as defined in claim 7 including convertible means for supporting a group of said ducts of said one size at locations intermediate selected junction boxes, each supporting means having a saddle bar positioned beneath the respective group of ducts, and spacer elements on said saddle bar aligned with the spacer elements of adjacent junction boxes, said spacer elements on said saddle bar being removable whereby said saddle bar can accommodate said larger ducts.

12. A convertible duct supporting device for use in an underfloor duct system, said device comprising a duct supporting lower bar adapted to support a plurality of ducts of one size, a plurality of separate spacing elements supported by said lower bar in engagement therewith and equally spaced apart from each other longitudinally along said lower bar by a distance equal to the width of one of said ducts of said one size, an upper bar supported by said spacing elements, means for clamping said bars and spacing elements together, and additional means carried by said upper bar and movable relatively thereto for securing ducts within said openings and insuring electrical grounding thereof, said bars and pairs of adjacent spacing elements completely defining duct receiving openings respectively adapted to receive ducts of said one size, and removal of one of said spacing elements between two of said duct receiving openings for receiving ducts of said one size converting said two openings into a single larger opening completely defined by said bars and two of said spacing elements and adapted to receive a larger size duct of a width equal to twice the width of one of said ducts of said one size plus the width of the removed spacing element.

References Cited in the file of this patent

UNITED STATES PATENTS

| | | |
|---|---|---|
| 733,568 | Sundh | July 14, 1903 |
| 1,536,748 | Ashley | May 5, 1925 |
| 1,592,548 | Walker | July 13, 1926 |
| 1,626,570 | Walker | Apr. 26, 1927 |
| 1,675,219 | Kent | June 26, 1928 |
| 1,691,072 | Jones | Nov. 13, 1928 |
| 1,782,779 | Fullman | Nov. 25, 1930 |
| 1,908,067 | Sharp et al. | May 9, 1933 |
| 1,924,305 | Blinn | Aug. 29, 1933 |
| 2,063,569 | Walker | Dec. 8, 1936 |
| 2,126,014 | Holub | Aug. 9, 1938 |
| 2,611,500 | Martin | Sept. 23, 1952 |
| 2,741,117 | Hoseason | Apr. 10, 1957 |
| 2,847,140 | Voss | Aug. 12, 1958 |
| 2,886,630 | Gill | May 12, 1959 |
| 2,929,529 | Hudson | Mar. 22, 1960 |

FOREIGN PATENTS

| | | |
|---|---|---|
| 565,995 | Great Britain | Dec. 7, 1944 |
| 748,277 | Great Britain | Apr. 25, 1956 |
| 755,437 | Great Britain | Sept. 19, 1956 |

OTHER REFERENCES

Martin, abstract of application Serial Number 172,165, published November 6, 1951, 652 O.G. 290–291.